Feb. 6, 1968     J. L. SAYRE, JR     3,367,299

UNDERWATER RECOVERY VEHICLE

Filed Aug. 1, 1966     4 Sheets-Sheet 1

INVENTOR.
JACK L. SAYRE, JR.
BY
V. C. MULLER
ROY MILLER
ATTORNEYS.

Feb. 6, 1968  J. L. SAYRE, JR  3,367,299
UNDERWATER RECOVERY VEHICLE
Filed Aug. 1, 1966  4 Sheets-Sheet 3

INVENTOR.
JACK L. SAYRE, JR.
BY
V. C. MULLER
ROY MILLER
ATTORNEYS.

INVENTOR.
JACK L. SAYRE, JR.
BY
V. C. MULLER
ROY MILLER
ATTORNEYS.

3,367,299
UNDERWATER RECOVERY VEHICLE
Jack L. Sayre, Jr., Duarte, Calif., assignor to the United
 States of America as represented by the Secretary of
 the Navy
Filed Aug. 1, 1966, Ser. No. 569,523
1 Claim. (Cl. 114—51)

The invention described herein may be manufactured and used by or for the Government of the United States of America for governmental purposes without the payment of any royalties thereon or therefor.

This invention relates to improvements in apparatus for the recovery of objects on the floor of the sea and more particularly to an unmanned vehicle, controlled by a surface vessel, which may locate the sunken object, and attach recovery apparatus to it which may then permit raising of the object independent of the vehicle. Such vehicle is commonly known as the Cable-Controlled Underwater Research Vehicle (CURV).

In the testing of negatively buoyant torpedoes and other underwater ordnance devices the test device is sometimes lost on the floor of the sea after a test run, which, if it be at considerable depth, particularly beyond diver depth, presents serious problems in the recovery of the device, which, in addition to its relatively high cost also contains valuable test data recorded during its run which is invaluable in the determination of the possible malfunction. While manned vehicles are now known which descend to great depths they suffer certain disadvantages such as high initial cost and limited search periods.

One of the objects of this invention is to provide an improved vehicle which may remain submerged indefinitely with which a sunken object may be located, recovery apparatus attached to it, and the recovery apparatus and sunken object raised to the surface of the sea independent of the vehicle.

Another object is to provide a recovery tool on the vehicle which may be oriented to desired positions to attach it to the sunken object and to thereafter eject it from the vehicle on command from a surface vessel, the operations all being visible on a TV screen located on the surface vessel.

Another object is to provide an ejection mechanism for receiving various recovery tools which may be selected in accordance with the shape, size or nature of the sunken object.

Still further objects, advantages and salient features will become more apparent from the description to follow, the appended claim, and the accompanying drawing in which:

Figure 2:
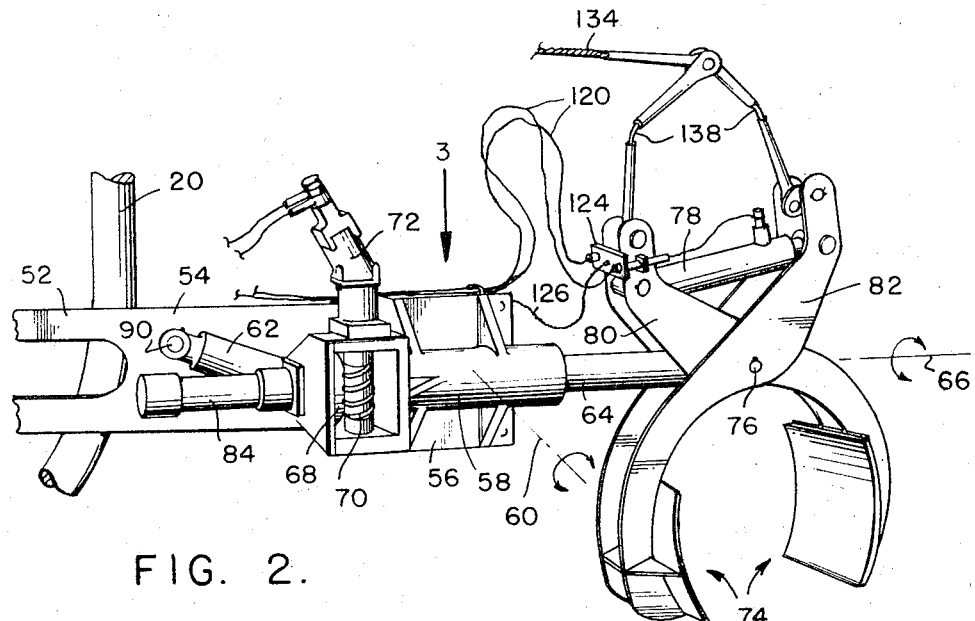
FIG. 2 is an enlarged detail, as viewed in the direction of arrow 2, FIG. 1.
Figure 3:
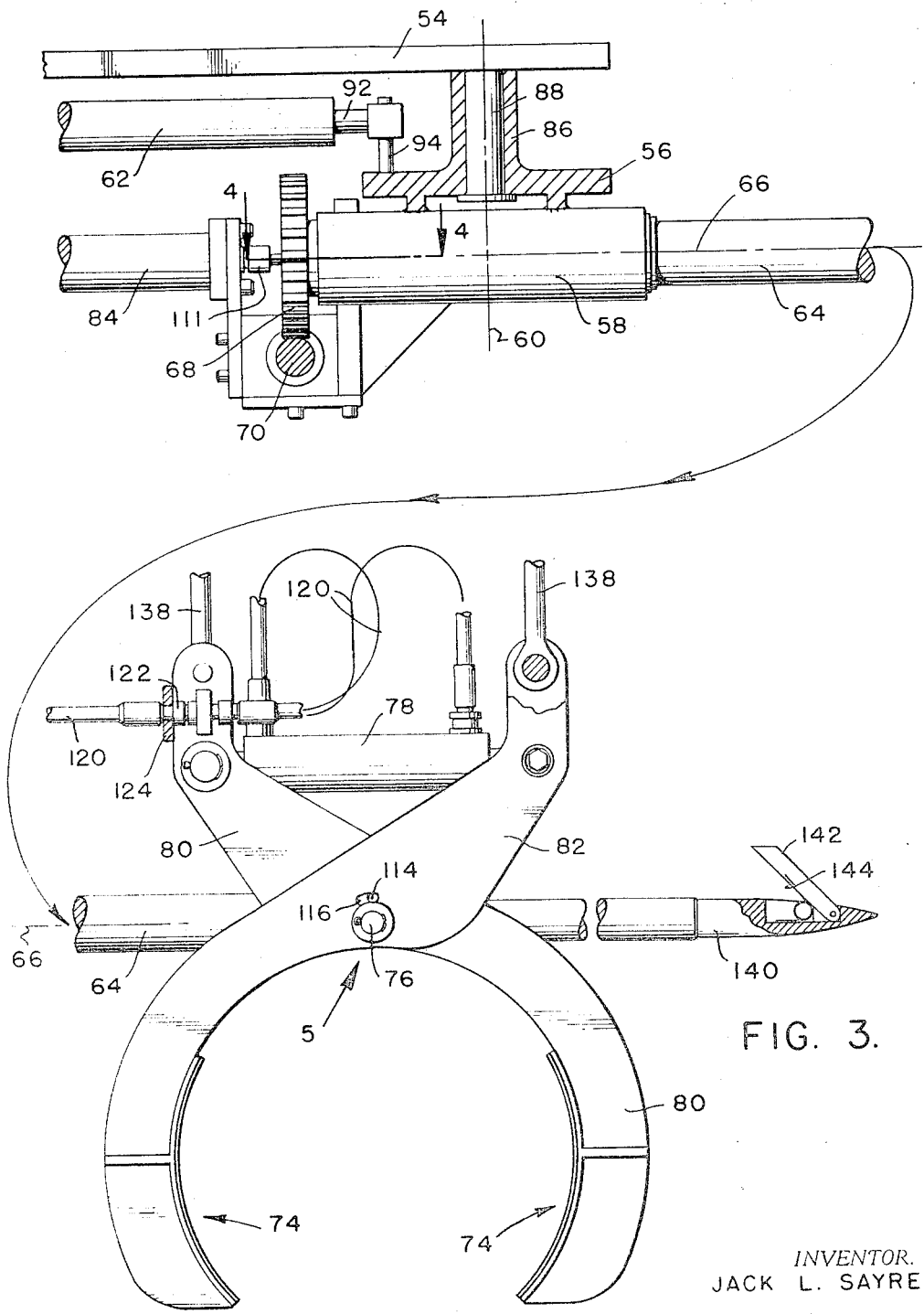
Figure 4:
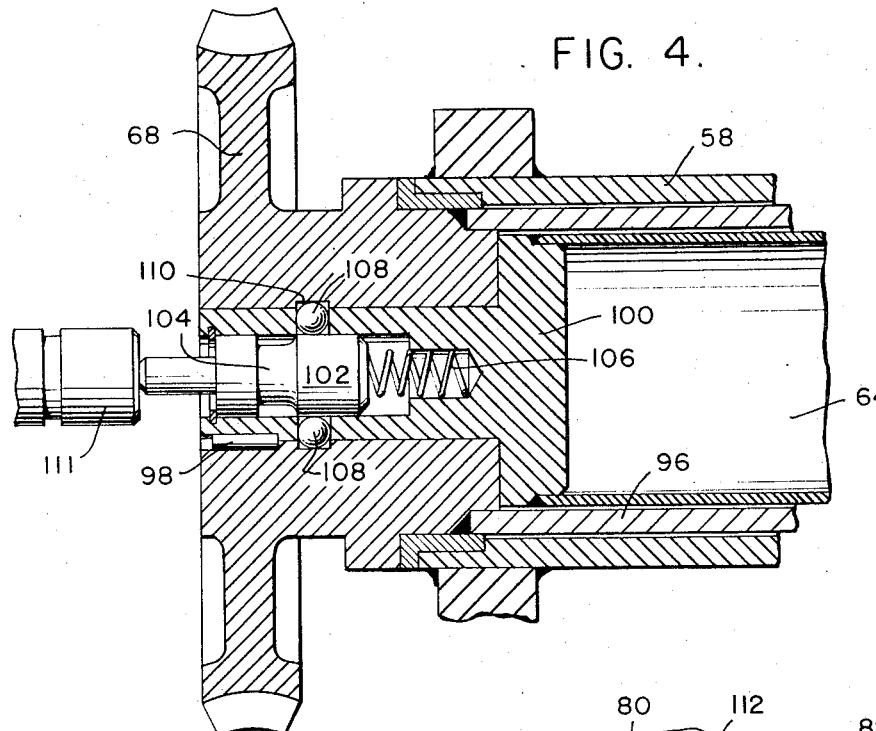
Figure 5:
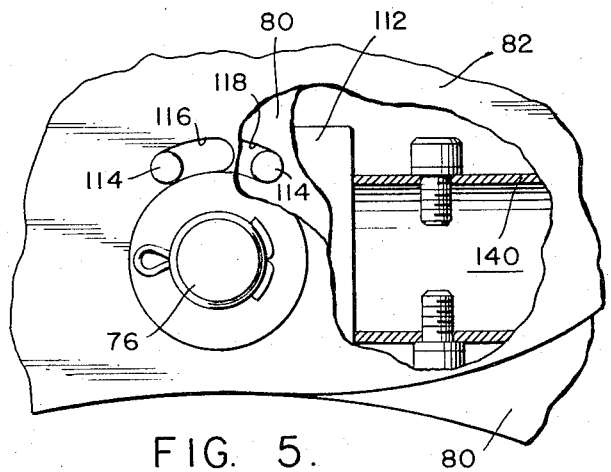
Figure 6:
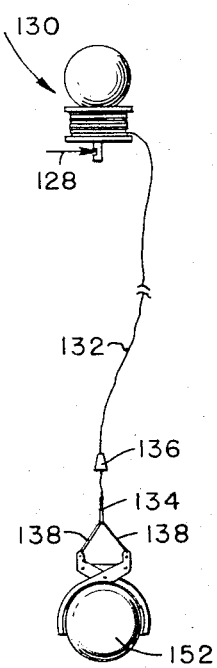

FIG. 3 is an enlarged top plan as viewed in the direction of arrow 3, FIG. 2, portions being shown in section and others rotated 90° to a vertical plane containing arrow 3;

FIG. 4 is an enlarged section taken on line 4—4, FIG. 3;

FIG. 5 is an enlarged detail as viewed in the direction of arrow 5, FIG. 3, portions being broken away;

FIG. 6 illustrates a phase in a recovery operation; and

Figure 7:
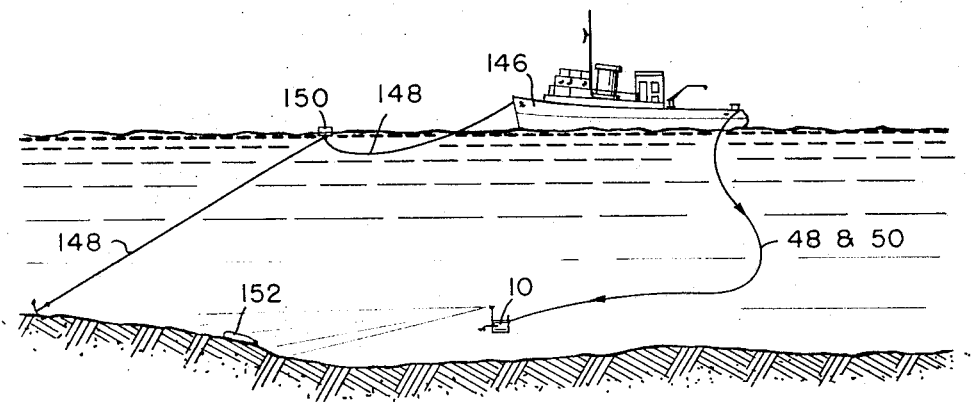
Figure 7A:
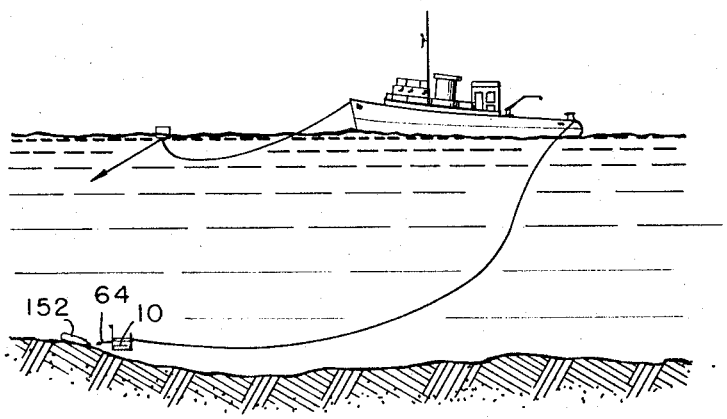
Figure 7B:
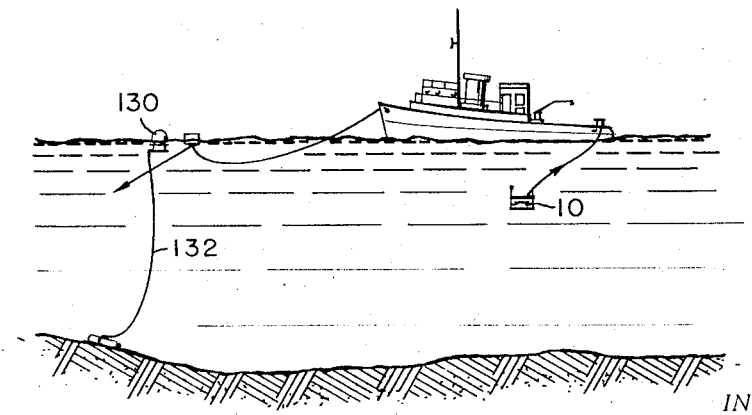

FIGS. 7, 7A and 7B illustrate other phases of a recovery operation.

Figure 1:
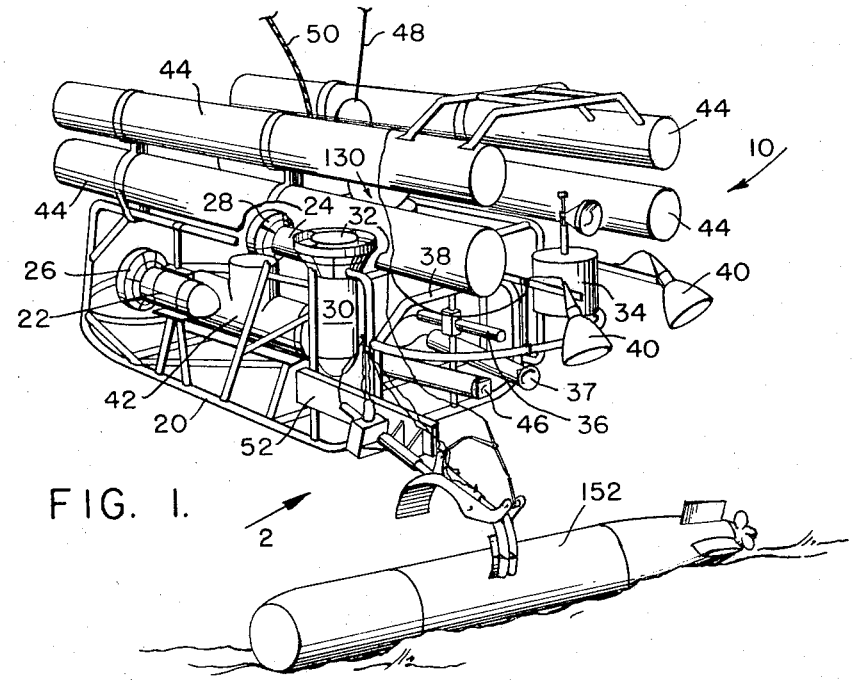
FIG. 1 is a perspective of the vehicle.

Referring now to the drawing, and first to FIG. 1, the CURV vehicle 10 comprises, in general, a suitable frame 20 to which are affixed a pair of propulsion motors 22, 24 which rotate propellers 26, 28 and a third propulsion motor 30 which rotates a propeller 32. All motors are of the variable speed reversible D.C. type and by choice of direction of rotation, or relative speed of rotation, motors 22, 24 may cause movement of the vehicle in the horizontal direction and also steer it in directions about its vertical axis while motor 30, by choice of its direction of rotation, causes movement of the vehicle in the vertical direction. Thus, the vehicle may be maneuvered in any desired direction and at desired speeds during its search for a sunken object. Sonar apparatus 34, either active or passive, is affixed to the forward end of the vehicle for locating various objects on the floor of the sea and transmitting signals to the surface vessel. A TV camera 36, supported by a motor driven gimbal 38, is disposed at the forward end of the vehicle, the axis of which may be aimed as desired by rotation about the gimbal axes. Suitable lights 40, are provided to illuminate a sunken object when the vehicle reaches viewing distance. An electrically driven hydraulic device 42 provides fluid under pressure for operating certain of the instrumentalities to subsequently be described in greater detail. Buoyancy tanks 44 are affixed to the frame to render the vehicle slightly buoyant, one purpose of which is to produce an upwardly directed propeller wash from vertical propeller 32, thereby preventing disturbance of silt or the like on the floor of the sea which might otherwise obscure the view of the TV camera. An Edgerton camera 46, carried by the gimbal for documenting events during the search, may be provided if desired, illumination being provided by strobe light 37. The vehicle is tethered to a surface vessel by a reel controlled cable 48 and another reel controlled electrical conduit 50. Conduit 50 contains a plurality of conductors for controlling all instrumentalities on the vehicle. These include conductors for furnishing electrical energy to the propulsion motors and the hydraulic pressure source, operation of all valves for controlling flow of fluid under pressure to the various hydraulic actuators, operation of the release of a buoyant reel, and transmission of all vehicle navigational, sonar and TV signals to the surface vessel. Since the various components so far described do not constitute any part of the invention per se they have been described only briefly in the interests of simplification of the disclosure. As will be apparent, the vehicle so far described may search, locate and view a sunken object and transmit information to a surface ship but has no capacity to recover the object.

Referring now to FIGS. 2 and 3, a member 52 is rigidly affixed to frame 20, its forward cantilevered end 54 providing a support for sunken object recovery apparatus which will now be described. Briefly, this comprises a plate-like member 56, welded to a tube 58 which may be bodily rotated about a horizontal axis 60 by a double acting hydraulic actuator 62. An arm 64 is rotatably supported by tube 58 for rotation about a generally horizontal axis 66, the arm being rotated by a worm wheel 68, affixed to the arm, which is driven by a worm 70 coupled to a reversible hydraulic motor 72. The outer end of the arm carries a clam shell tool 74, pivotally supported by the arm by a pivot 76, the clam shell being opened or closed by a double acting hydraulic actuator 78, connected between arms 80, 82 of the clam shell. An ejection cylinder 84 contains a piston, which when actuated, operates a dentent mechanism which releases arm 64 and its attached clam shell from tube 58 and forces the arm part way out of the tube. It is then completely removed from the tube by backing the vehicle away from the object to be recovered which will now have the clam shell attached to it.

Referring now to FIG. 3 plate 56 is supported by the end of arm 54 by a journal 86 rotatably engaging a pivot pin 88 affixed to support 54. One end of hydraulic motor 62 is connected to support 54 by a pivot pin 90 FIG. 2) and its piston rod 92 is connected to a crank pin 94 carreid by plate 56. As will be apparent, when fluid under pressure is admitted to one side or the other of double acting actuator 62, plate 56 and its attached tube 58 are rotated in one direction or the other about axis 60.

Referring now to FIG. 4, worm wheel 68 is affixed to a tube 96 journaled in tube 58 and is drivingly connected to arm 64 by a spline or key connection 98 disposed between the worm wheel and a plug 100, forming the inner end of tubular arm 64. Plug 100 is provided with a central bore which carries a detent device comprising a slideable cylindrical member 102 having an annular groove 104, the member being urged to the position shown by a spring 106. When in this position, a plurality of angularly spaced balls 108 are maintained within a groove 110, locking arm 64 to tube 96. When it is desired to release this connection, piston rod 111, forming a part of actuator 84, is moved in opposition to the urge of the spring, permitting the balls to enter groove 104, thus releasing arm 64 from tube 96. Upon continued motion of piston rod 111, it abuts plug 100, forcing arm 64 part way out of tube 96. As previously referred to, the vehicle is then backed away from the sunken object, permitting arm 64 to be completely separated or ejected from the vehicle.

Arm 64, just referred to, is provided with a rectangular block 112 at its outer end, as best shown in FIG. 5, which receives pivot pin 76, its outer opposite ends pivotally engaging the clam shell arms 80, 82, a pair of which are disposed on each side of the block. A pair of circular pins 114 are carried by the block, their ends being disposed in arcuate slots 116, in each of the pair of outer arms 82, and like slots 118 in the pair of inner arms 80. When the clam shell is open, each pin abuts one end of its cooperating slot and positions the clam shell so that its jaws open the same amount about the axis of pin 76, thus preventing any relative rotation of either pair of jaws about the axis of pin 76. When the jaws are moved to closed position on the sunken object the pins are then disposed intermediate the ends of the slots.

The hydraulic conduits 120 for operating actuator 78 are connected to it by conventional detachable fittings 122 which are provided with check valves which close when the conduits are pulled away from the fittings. As best shown in FIG. 2, a plate 124 is connected to the ends of conduits 120 and a slack lanyard 126 is connected at one end to the center of plate 124, its other end being connected to the vehicle. When arm 64 and its attached clam shell are ejected the lanyard becomes taut and pulls the conduits from their fittings.

Referring now to FIG. 6, and assuming that the clam shell has been attached to the sunken object, a solenoid operated detent 128 is actuated which releases a buoyant reel 130 from vehicle 10 which ascends to the surface of the sea as illustrated in FIG. 7B. The free end of the nylon reel line 132 is connected to a short length of steel cable 134 the upper end of which is provided with a generally conical head 136. The other end of the cable is pivotally attached to a pair of cables 138, the lower ends of which are attached to arms 80, 82, as best shown in FIG. 2.

While the clam shell recovery tool, so far described, is well adapted for recovery of torpedoes it is apparent that other tools may be attached to arm 64. As shown in FIGS. 3 and 5, a spear-like member 140, having a barb 142, urged outwardly by a spring 144, may be attached to arm 64 in lieu of the clam shell or in addition to the clam shell. If the sunken object has a cavity which is susceptible to entry of the spear and locking of the barb, this tool may be preferred for recovery of such objects. As will be apparent, other tools which are best adapted for the recovery of a particular sunken object may be attached to arm 64.

In operation, and referring now to FIGS. 7, 7A, and 7B a surface vessel 146 is maneuvered to the known general location of a sunken object which is to be recovered and is anchored by an anchor line 148, preferably having a buoy 150 disposed intermediate its ends. The CURV vehicle 10 is lowered into the water by a crane on the vessel and its propulsion motors are activated to cause it to swim in a predetermined search pattern, its sonar transmitting signals to the surface vehicle where a plot is made of its search pattern and any objects on the floor of the sea. When their position is known, the CURV vehicle is maneuvered to a position in which its TV camera may identify a sunken object to determine whether it is the one to be recovered, and transmits the TV picture to a screen on the surface vessel. FIG. 7A illustrates the position of the vehicle after the desired sunken object, such as torpedo 152, has been identified. The vehicle is then maneuvered to a position adjacent the sunken object as illustrated in FIGS. 1 and 7A in which attachment of a recovery tool such as the clam shell, is most advantageous. The arm carrying the clam shell is then rotated about its two axes to a position in which it may engage the object. The claim shell is then closed on the object and the arm detent is actuated, unlocking the arm and partially effecting it from the vehicle. As the vehicle is backed away from the sunken object, lanyard 126 becomes taut, causing the hydraulic lines extending to the clam shell actuating cylinder to be separated from their fittings. The check valves in the fittings then close, trapping the fluid in the clam shell actuating cylinder and retaining the clam shell locked to the object. The reel and float device 130 is then released from the vehicle which ascends to the surface. The surface vessel then proceeds to the locus of the reel and float device and recovers the same. A "go-getter" is then lowered by a cable, following the nylon line until it engages and latches onto head 136 after which the sunken object is raised to the surface by the go-getter and its attached cable. The operation just described is for recovering a relatively heavy object. If the object is only slightly non-buoyant, the recovery tool may remain attached to the vehicle and raised to the surface with the vehicle.

Obviously many modifications and variations of the present invention are possible in the light of the above teachings. It is therefore to be understood that within the scope of the appended claim the invention may be practiced otherwise than as specifically described.

What is claimed is:

1. Apparatus for recovering an object disposed on the floor of the sea including a vehicle adapted to be tethered to a surface vessel by an extensible cable and an electrical control conduit, the vehicle having propulsion means for maneuvering it in a desired search zone and controlled from the surface vessel, said vehicle having sonar apparatus for initially locating the object and a TV camera for viewing the object when the vehicle approaches it to viewing distance, and including a TV screen on the surface vessel for viewing the object, the improvements, in combination, comprising:

(a) An elongated detachable arm carried by the vehicle extending in a generally horizontal direction,
   (b) means for rotating the arm about its longitudinal axis and about a transverse horizontal axis,
   (c) means carried by the arm for securing it to the object,
   (d) means for detaching the arm from the vehicle, and
   (e) means for raising the detached arm and the object secured thereto the surface of the sea independent of the vehicle.

References Cited

UNITED STATES PATENTS 2,939,416   8/1967   Calabrese _____ 114—51

ANDREW H. FARRELL, *Primary Examiner.*